Feb. 14, 1939.   I. J. SNADER   2,146,774
PISTON TURNING MACHINE
Filed March 11, 1936   2 Sheets-Sheet 1
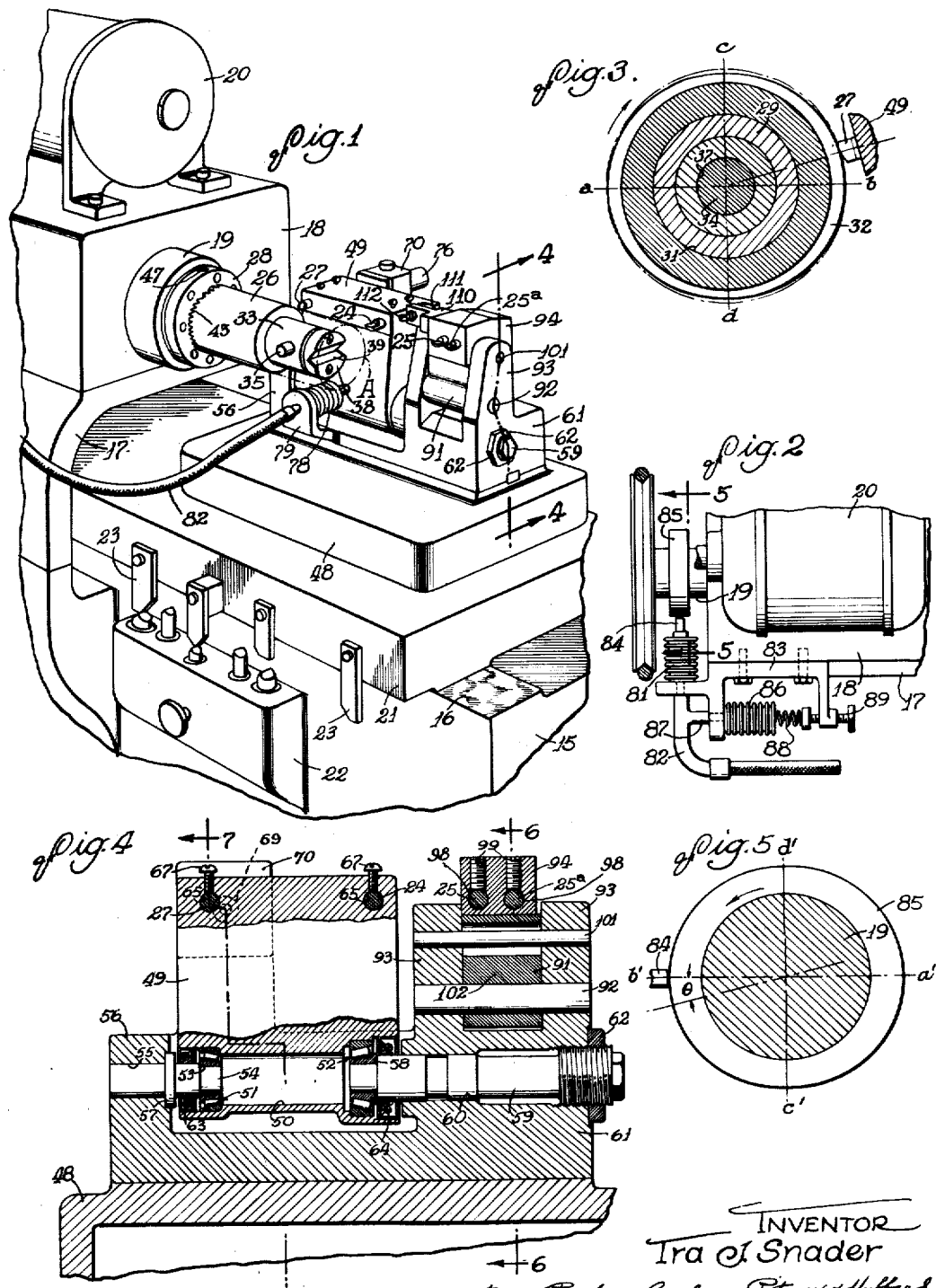
INVENTOR
Ira J. Snader
By Parker, Carlson, Pitzner & Hubbard
ATTORNEYS

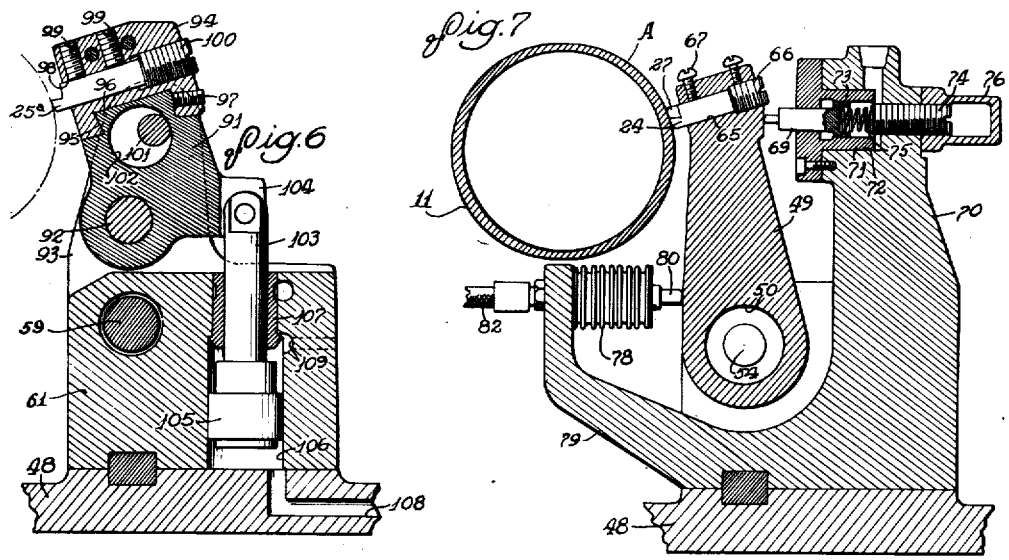
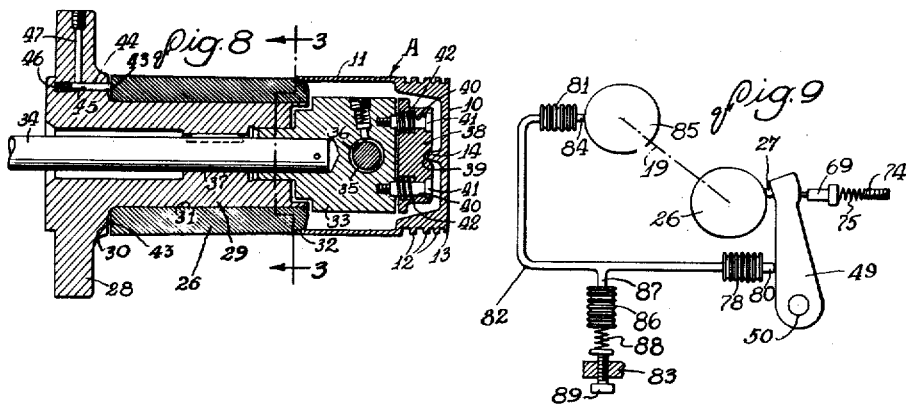
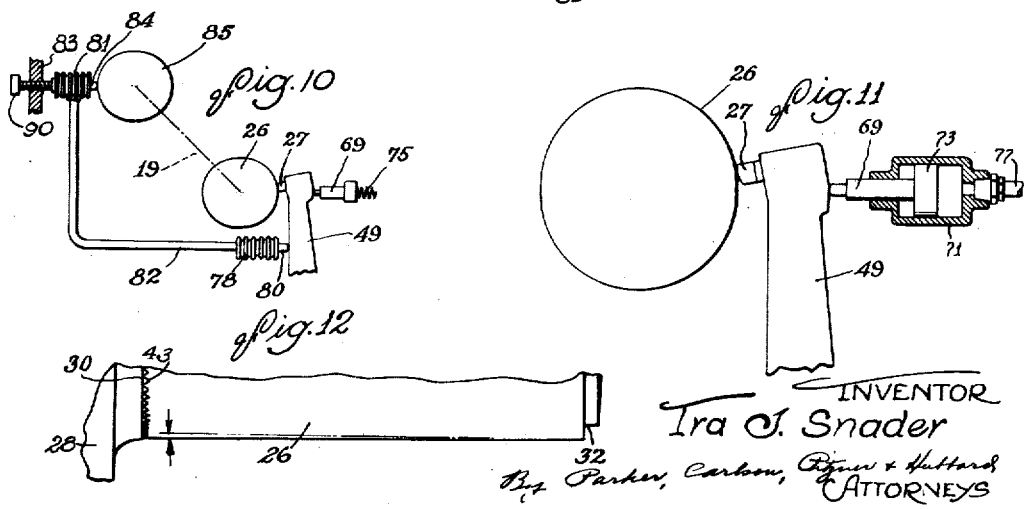

Patented Feb. 14, 1939

2,146,774

UNITED STATES PATENT OFFICE 2,146,774

PISTON TURNING MACHINE

Ira J. Snader, Detroit, Mich., assignor to Ex-Cell-O Corporation, a corporation of Michigan Application March 11, 1936, Serial No. 68,221

27 Claims. (Cl. 82—19)

The present invention relates to improvements in machines for turning work pieces, such as automotive pistons, and has particular reference to such machine in which the form or shape to be produced by at least one cutting tool is controlled by a cam.

One of the objects of the invention is to provide a novel turning machine having one or more turning tools mounted for oscillation on accurately adjustable anti-friction bearings for movement toward and from the work piece, whereby lost motion, vibration, and objectionable friction are substantially avoided, and hence close accuracy at a high rate of cutting speed is obtainable.

Another object resides in the provision in a turning machine of a light oscillatory holder for a cutting tool, and a cam follower associated with the holder and coacting with a master cam for determining the form or shape of the work piece.

A further object resides in the provison of new and improved means for urging the follower toward the cam with a substantially uniform pressure sufficient to maintain intimate contact without objectionable wear during the cutting operation, and on occasion for lifting the follower from the cam to retract the tool from operative position.

Another object is to provide a new and improved cam controlled turning fixture adaptable for use on a precison diamond or fly-tool boring machine to turn elliptical or irregularly shaped work pieces, such as automotive pistons.

A further object resides in the provision of novel means operable automatically to compensate for variations in the contact pressure between the cam and the follower tending to result from the inertia forces set up by eccentricites on the face of the rapidly rotating master cam, thereby insuring a uniform pressure at all times, and hence avoiding objectionable and localized wear.

Still another object resides in the provision of a hardened steel rotary master cam, and a cam follower of non-metallic material coacting therewith to control the turning tool, thereby adapting the machine particularly for a high rate of turning speed and the use of diamond or cemented-carbide tools.

Further objects and advantages will become apparent as the description proceeds.

In the accompanying drawings, Figure 1 is a fragmentary perspective view of a machine embodying the features of my invention.

Fig. 2 is a fragmentary plan view of the machine.

Fig. 3 is a fragmentary transverse sectional view taken along line 3—3 of Fig. 8 through the master cam.

Fig. 4 is a fragmentary generally vertical sectional view through the tool fixture taken substantially along line 4—4 of Fig. 1.

Fig. 5 is a fragmentary transverse sectional view taken along line 5—5 of Fig. 2.

Figs. 6 and 7 are transverse sectional views of the work fixture taken respectively along lines 6—6 and 7—7 of Fig. 4.

Fig. 8 is an axial sectional view of the master cam, the work piece and the supporting means therefor.

Fig. 9 is a diagrammatic view of the pressure compensating means.

Fig. 10 is a view similar to Fig. 9, but illustrating a modified form of pressure compensating means.

Fig. 11 is a fragmentary view of a modified form of tool fixture.

Fig. 12 is a fragmentary view of the master cam.

Referring more particularly to the drawings, the invention in its general aspects is not limited to any particular type of machine, for example, horizontal or vertical, single or multiple spindle, intermittent or continuous turning, etc., nor to any one kind of work piece, but is especially adapted for, and hence illustrated as applied to, the turning of automotive pistons and other similarly shaped work pieces. I have, therefore, shown an automotive piston A having a closed dome or head 10, and an open-ended skirt 11 with spaced ring land areas 12 and 13 adjacent its closed end. A diametrical rib 14 may be formed on the inner face of the head 10.

Preferably, the machine is of the horizontal type, and an adaptation of the precision fly-tool boring machine illustrated in Alden application Serial No. 723,125, filed April 30, 1934. The machine comprises a horizontal base 15 with longitudinal ways 16 on the top. A bridge 17 is mounted on one end of the base 15, and supports a spindle housing 18. A spindle 19 is journaled in the housing 18 lengthwise of the base 15, and may be driven by any suitable power means, such as an electric motor 20 mounted on the top of the housing. Mounted for reciprocation on the ways 16 and extending beneath the bridge 17 is a suitable carriage or table 21.

The drive for the table 21 may be of any suitable character, but preferably is of the hydraulic type and comprises a control panel 22 on the front of the base 15 operable by table dogs 23 to obtain a predetermined automatic cycle, for example, a rapid approach and a feed to the left and then a rapid return to loading position. For a more detailed understanding of the hydraulic table drive, reference may be had to the aforesaid Alden application.

The piston A is rotated in a fixed axial position through a suitable drive connection with the spindle 19. A plurality of turning tools 24, 25 and 25ª, respectively for turning the skirt 11 and ring areas 12 and 13, are mounted on the table 21 for reciprocation therewith and for movement transversely of the axis of the piston A. The tools 24, 25 and 25ª may be made of any suitable material, such as diamond or cemented carbide. A suitable master cam 26, rotatable in synchronism with the piston A, coacts with a follower 27 to control the transverse movements of the tool 24 during the cutting stroke of the table 21, and thereby to determine the form and contour of the piston skirt 11.

It will be understood that the piston A may be turned to any desired shape and that the master cam 26 will have a shape corresponding to that of the piston skirt 11. Preferably, the skirt 11 is tapered longitudinally and is elliptical in cross-section, and the ring lands 12 and 13 are turned to a cylindrical form, with the inner lands 12 having a greater diameter than the outermost land 13. The cam 26 therefore is also tapered longitudinally and elliptical in cross-section, with major and minor axes a—b and c—d, and the tools 25 and 25ª are presented in a fixed operative position at different distances from the center of the piston A.

Any suitable means may be provided for supporting the piston A and connecting it for a rotary drive to the spindle 19. In the present instance, this means (see Fig. 8) comprises an adapter plate 28 secured directly to the spindle 19, and formed with an axial tubular projection 29 and an annular clamping face or shoulder 30 at the base of the latter. The master cam 26 has an axial bore 31 adapted slidably to receive the projection 29. One end of the cam 26 seats against the shoulder 30, and the other end is formed externally with an annular centering notch 32 adapted to interfit with the open end of the piston skirt 11. The piston A and cam 26 are secured in coaxially assembled relation against the shoulder 30 by a clamp comprising a head 33 on the outer end of a spring actuated draw bar or rod 34. A driving member 35, in the form of a pin, extends through a cross bore 36 in the clamp head 33 and is keyed against axial movement therein, and extends into the cross pin holes of the piston A. The draw bar 34 is splined slidably with a guiding fit through an axial bore 37 in the projection 29 and through the spindle 19 for longitudinal actuation by any suitable means against the normal spring clamping pressure. It will be evident that when the bar 34 is moved to the left, the pin 35 will hold the piston A in axially centered relation against the cam 26, and the latter squarely against the shoulder 30.

The outer end of the piston A is located in proper timed or phase relation to the spindle 19 by a spring actuated member 38 on the outer end of the draw bar head 33. The locating member 38 is in the form of a block having a diametrical V-shaped notch 39 adapted to coact with the internal rib 14 of the closed end of the piston A, and having a plurality of bores 40 enlarged at their opposite ends. A plurality of bolts 41 extend slidably through the bores 40, and are threaded into the head 33. The heads of the bolts 41 are disposed in the enlarged outer ends of the bores 40, and serve to confine the member 38 against removal. Coiled compression springs 42 disposed in the enlarged inner ends of the bores 40 and about the bolts 41 tend to urge the member 38 outwardly for yieldable engagement with the rib 14.

The master cam 26 is adjustable on the projection 29 into, and adapted to be locked in, a predetermined angular position relative to the cross pin hole of the piston A. To this end, a plurality of small 90 degree serrations 43 are formed in the left end face of the cam 26, and are adapted for selective engagement by a pin 44 with a 90 degree milled point. The pin 44 is slidably disposed in a bore 45 opening to the shoulder 30, and is urged outwardly by a coiled compression spring 46. A set or lock screw 47 is adjustably threaded in the adapter plate 28, and adapted to be tightened against the side of the pin 44 to lock the cam 26 in position of adjustment.

The piston turning tools 24, 25 and 25ª form part of a tool fixture having a rigid sectional base 48 mounted in fixed position on the table 21.

The skirt turning tool 24 is mounted on the base 48 for movement transversely of the piston A into and out of operative position, and under the control of the master cam 26 when in operative position. Preferably, the tool 24 and the cam follower 27 are mounted for joint oscillatory movement, and to this end are adjustably mounted in the free upper end of a generally vertical oscillatory holder 49 (see Figs. 4 and 7). The lower end of the holder 49 is pivotally mounted on the base 48. More particularly, the lower end of the holder 49 is formed with a bore 50 parallel to the line of table travel, and enclosing at opposite ends anti-friction bearings 51 and 52 of the combination radial and end thrust type. The bearing 51 is mounted on a reduced end and against a shoulder 53 of a shaft 54 which is snugly disposed in a bore 55 in a lug 56 on the base 48, and which projects from the lug into the adjacent end of the bore 50. A peripheral collar 57 on the shaft 54 engages the inner side of the lug 56. The bearing 52 is mounted on a reduced inner end and against a shoulder 58 of a shaft 59 which extends through and is adjustably threaded at its outer end in a bore 60 in an upstanding bracket 61 on the base 48. It will be evident that the holder 49 is confined between the shoulders 53 and 58, and that radial and end play of the anti-friction bearings may be taken up by adjusting the shaft 59 in a direction toward the collar 57 which bears tightly against the lug 56. A lock nut 62 threaded on the shaft 59 against the bracket 61 serves to hold the parts in position of adjustment. Suitable oil seals 63 and 64 may be mounted in opposite ends of the bore 50 outside of the bearings 51 and 52.

The tool 24 and the cam follower 27 are removably secured in the upper end of the holder 49, and project therefrom for engagement respectively with the piston skirt 11 and the cam 26. The spacing longitudinally of the spindle 19 is such that as the tool 24 is advanced along the piston A, the follower 27 will engage corresponding parts of the cam 26. Also, the tool 24 and follower 27 are disposed in an angular position such that their contact points will describe arcs in a direction toward and from the center of rotation of the piston A and cam 26. The specific mounting for the tool 24 consists of a bore or socket 65 closed at one end by an adjustable screw plug 66. The tool 24 is clamped in the bore 65 against the plug 66 by a set screw 67. A similar mounting is provided for the cam follower 27. Hence, the tool 24 may be adjusted to compensate for wear and sharpening, and the tool and the follower may be adjusted relatively to each other and to the holder for the desired depth of cut and angular position of oscillation.

To maintain the follower 27 in intimate contact with the cam 26, and thereby insure accurate location of the tool 24, the rear face of the head of the holder 49 is engaged by a pressure actuated plunger 69 slidably disposed in the upper end of a standard 70 on the base 48. In the present instance, a flanged cylinder 71 is secured in a bore 72 in the front of the standard 70, and the plunger 69 extends into and has a piston 73 slidable in the cylinder 71. Pressure may be imparted to the piston 73 by any suitable means. In Fig. 7, an adjusting screw 74 is threaded into the closed end of the bore 72, and a coiled compression spring 75 is interposed between the piston 71 and the screw. The pressure of the spring 75 tends to urge the plunger 69 outwardly against the holder 49, and may be varied by adjusting the screw 74. A lock nut 76 is provided to secure the screw 74 in position of adjustment. In Fig. 11, the piston 73 is actuated hydraulically, the outer end of the cylinder 71 being connected through a line 77 to a suitable source of pressure fluid, such as the hydraulic circuit (not shown) of the table drive.

I have found that at the extremely high speeds which are customarily employed to obtain a good finish on the work, the inertia forces acting on the mass of the cam follower 27 and attached parts tend to result in considerable variation in the contact pressure. Thus, the rising areas of the cam 26, namely, the quadrants between c and a, and d and b (see Fig. 3), tend to induce a positive acceleration of the follower 27 away from the cam axis, thereby tending to increase the contact pressure and to cause undue and rapid wear. Conversely, the dropping areas of the cam 26, namely, the two quadrants between b and c and a and d, tend to induce a deceleration, and hence to lessen the contact pressure. The spring or hydraulic pressure acting on the holder 49 must be sufficient to overcome the deceleration in order to maintain intimate contact. The result is that during each period of acceleration, un'ess the inertia forces are compensated for, the pressure will be greater than required for intimate contact, and consequently more likely to result in uneven wear of the cam surface.

Pressure compensating means is therefore provided for maintaining the cam engagement pressure substantially uniform. In its preferred form, this means (see Figs. 2 and 7 to 10) comprises a pressure element, such as a corrugated cylindrical bellows 78 known in the trade as a Sylphon, which acts against the tool holder 49 in opposition to the plunger 69 with a force variab'e in accordance with the aforesaid accelerating and decelerating forces normally tending to influence the contact pressure between the cam 26 and the follower 27. Thus, the counterforce exerted by the member 78 is increased during the accelerating periods, and is reduced during the decelerating periods. The contact pressure is therefore equal to the effective pressure of the plunger 69, plus the accelerating force minus the correspondingly increased pressure of the member 78, or minus the decelerating force and the correspondingly reduced pressure of the member 78. The net pressure is substantially constant, and of a value just sufficient to maintain intimate contact, thereby avoiding objectionable and uneven wear, and permitting a high speed of work rotation.

The bellows 78 is closed and rigidly mounted at one end on a forwardly extending arm or bracket 79 rigid with the base 48. The other end of the bellows 78 is movable, and has a pin 80 directly engaging the holder 49. The bellows 78 forms part of, and is internally connected with, a closed hydraulic system filled with a suitable fluid, such as oil, glycerine, or other similar liquid, and subjected to varying pressures in timed relation to the rotation of the cam 26. This system also includes a second pressure responsive element, preferably in the form of a corrugated cylindrical bellows 81, which is connected internally through a pressure transmitting duct or tube 82 to the bellows 78. One end of the second bellows 81 is mounted in fixed position on a bracket 83 on the housing 18, and the other end is movable and has a pin 84 directly engaging the peripheral face of a pressure control cam 85 (see Fig. 5) on the left end of the spindle 19. The cam 85 corresponds closely in transverse size and shape to the master cam 26, i. e., is elliptical with major and minor axes $a'$, $b'$ and $c'$, $d'$ equal to the mean axes $a$, $b$ and $c$, $d$ of the cam 26, and defining accelerating quadrants $c'$, $a'$, and $d'$, $b'$ and decelerating quadrants $b'$, $c'$ and $a'$, $d'$.

As the cam 85 rotates, the bellows 81 is contracted and expanded to vary the pressure in the closed hydraulic system. The initial pressure may be adjusted by varying the fluid space. In Fig. 9, this is accomplished by means of a third pressure responsive element or corrugated cylindrical bellows 86 which is rigidly mounted at one end on the bracket 83 and connected internally through a branch pipe 87 to the pipe 82. The other end of the bellows 86 is movable and subjected to the collapsing pressure of a coil spring 88. A screw 89 threaded through the bracket 83 affords means for adjusting the pressure of the spring 88, and hence of the fluid pressure in the system. In the modified form of Fig. 10, adjustment of the pressure may be effected by a screw 90 threaded through the bracket 83 and providing an adjustable support for the normally fixed end of the bellows 81.

To provide for the time required for transmission of pressure changes to the bellows 78, i. e., for the natural period of lag, the cam 85 is adjustably mounted on the spindle 19 in an advanced angular position relative to the cam 26. The difference in angular phase is indicated in Fig. 5 by the angle $\theta$. The period of lag will depend upon the speed of rotation, and hence the angle $\theta$ is increased if the speed is increased.

One of the important features of the invention resides in forming the master cam 26 of hardened steel, and the follower 27 of a non-metallic material. Thus, the follower 27 may be formed of lignum vitae, or a plastic formed from a phenol resin, which may be solid or of laminated construction with alternate layers of cloth, or other similar material. I have found that when the cam 26 and the follower 27 are formed in the foregoing manner, a contact pressure of sufficient force to permit high speeds may be maintained without resulting in objectionable wear. By reason of the invention, much higher speeds than were heretofore practicable are obtainable in turning irregular or elliptical surfaces on work pieces. These increased speeds result in a bright glossy surface on the work which could not be otherwise accomplished.

The turning tools 25 and 25ᵃ for the ring lands 12 and 13 are mounted in the free upper end of a generally vertical tool holder 91 (see Fig. 6) which is pivotally mounted on a fixed bearing pin 92 between two parallel upstanding lugs 93 on the base 48. To provide for adjustment longitudinally of the spindle 19 and hence relatively to the tool 24, both tools 25 and 25ᵃ are mounted in a transverse slide 94 on the free upper end of the holder 91. The slide 94 has a dovetailed guideway 95 engaging a complementary guide 96 on the holder 91, and may be secured in position of adjustment by a set screw 97. Each of the tools 25 and 25a is adjustably mounted in a separate transverse bore 98 in the slide 94, and normally is held in position by set screws 99. A screw plug 100 threaded into the rear of each bore 98 affords a backing and a means of adjustment when the screws 99 are released. As in the case of the tool 24, each of the tools 25 and 25ᵃ is disposed at an angle such that the arc of movement of the cutting point is directed toward the center of the piston A. It will be understood that the tool 25 for the ring lands 12 is adjusted to take a cut on a larger diameter than the tool 25ᵃ for the ring land 13.

The tool holder 91 is adapted to be moved into and out of a predetermined operative position since the tools 25 and 25ᵃ are intended to cut the ring lands to cylindrical form. The operative position is defined by a stop pin 101 fixed in the lugs 93 and extending therebetween through a large transverse bore 102 in the upper end portion of the holder 91. Any suitable means may be provided for actuating the holder 91, and in the present instance this means comprises a vertical piston rod 103 pivotally connected at its upper end to a lug 104 on the rear of the holder 91, and connected at its lower end to a piston 105 reciprocable in a bore or cylinder 106 formed in the base 48. The piston rod 103 extends slidably through a bushing 107 closing the upper end of the cylinder 106.

The cylinder 106 opens at opposite ends to pressure fluid lines or passages 108 and 109 adapted to be connected alternately to a suitable source of fluid under pressure. Preferably, the lines 108 and 109 are connected to the hydraulic system for the table drive in such a manner that when the table 21 is moved to the left, pressure fluid will be supplied through the line 108 and exhausted through the line 109, thereby projecting the tools 25 and 25ᵃ into operative position defined by engagement of the rear side of the bore 102 with the pin 101, and when the table is moved to the right, pressure fluid will be supplied through the line 109 and exhausted through the line 108, thereby retracting the tools into inoperative position defined by engagement of the front side of the bore 102 with the pin 101.

The oscillatory movement of the holder 91 is utilized to retract the holder 49 into inoperative position during the return movement of the table 21. Thus, a lug 110 rigid with one side of the holder 91 projects in front of a lug 111 on the adjacent side of the holder 49. An adjustment screw 112 in the lug 110 is positioned to engage the lug 111 and thereby to retract the holder 49 into inoperative position against the action of the plunger 69 when the piston 105 is moved downwardly upon institution of the return movement of the table 21.

The operation will now be briefly described. Initially the table 21 is at the right end of its stroke in work loading position, and the tools 24, 25 and 25ᵃ are retracted into inoperative position. After the piston A is properly secured to the spindle 19, the machine cycle is started, the various tools being projected into operative position, the table 21 being moved to the left on its cutting stroke, and the spindle 19 being rotated at a high speed. Just before the tools move into cutting engagement with the piston A, the hydraulic system is adjusted to reduce the traverse speed of the table 21 to a feed. In the course of the feed, the tool 24 will turn the piston skirt 11 to the correct cam form and taper as determined by the master cam 26, and the tools 25 and 25ᵃ will turn the ring lands to their respective diameters. It will be understood that the pressure controlling cam 85, rotating in timed relation to the cam 26, will vary the pressure acting on the tool holder 49 to maintain a substantially constant pressure on the follower 27 regardless of the forces of inertia set up by the accelerating and decelerating movements imparted by the master cam to the follower. When the table 21 reaches the end of its feed stroke, the drive is reversed, thereby instantly retracting the tools from the piston A and returning the table at a rapid speed to its inoperative or loading position. Since the tools are retracted during the return movement the surface of the piston will remain smooth and unmarred by drag lines.

Since the contact pressure between the cam 26 and follower 27 is maintained substantially constant and since the cam is made of a hardened steel and the follower is made of a non-metallic material, wear is reduced to a minimum. By reason of the relatively light oscillatory holder 49 and the adjustable low friction mounting therefor, the machine can be operated at a very high speed for precision work.

I claim as my invention:

1. In a metal turning machine, in combination, a drive spindle for rotating a work piece having two axially spaced areas to be turned cylindrically to two different diameters, a support relatively movable axially of the work piece, a tool holder mounted on said support for angular adjustment transversely of the work piece selectively into operative or inoperative position, means for defining said operative position, hydraulic means for adjusting said holder, a slide mounted on the free end of said holder for selective adjustment longitudinally of the work piece, and two cutting tools adjustably mounted on said slide and projecting laterally from said slide respectively for turning said work areas.

2. In a metal turning machine, in combination, a drive spindle for rotating a work piece having two axially spaced areas to be turned cylindrically to two different diameters, a support relatively movable axially of the work piece, a tool holder mounted on said support, a slide mounted on the free end of said holder for selective adjustment longitudinally of the work piece, and two cutting tools adjustably mounted on said slide and projecting laterally from said slide respectively for turning said work areas.

3. In a metal turning machine, in combination, a drive spindle for rotating a work piece having two axially spaced areas to be turned cylindrically to two different diameters, a support relatively movable axially of the work piece, a tool holder mounted on said suport for angular adjustment transversely of the work piece selectively into operative or inoperative position, means for defining said operative position, hydraulic means for adjusting said holder, and two cutting tools adjustably mounted on and projecting laterally from said holder for turning said work areas.

4. In a metal turning machine, in combination, a spindle for supporting a rotary work piece, a master cam of eccentric form mounted on said spindle for rotation therewith, a tool fixture having an upstanding bracket, a holder mounted on said fixture for oscillation transversely of said cam, a follower on said holder for engaging the periphery of said cam, adjustable spring means mounted on said bracket and acting against said holder to urge said follower against said cam, a control cam corresponding in transverse form to said master cam and mounted on said spindle for rotation therewith, an extensible and contractible bellows mounted on said fixture and engaging said holder with a pressure tending to separate said follower from said master cam, an extensible and contractible bellows coacting with said control cam, a fluid line connecting said bellows, said bellows and line constituting a closed hydraulic pressure transmitting system adapted to be filled with a fluid under a predetermined normal pressure, an extensible and contractible bellows connected to said sytem and adjustable to vary the normal fluid pressure therein, and a cutting tool on said holder for engaging the work piece.

5. In a metal turning machine, in combination, a spindle for supporting a rotary work piece, a master cam of eccentric form mounted on said spindle for rotation therewith, a tool fixture having an upstanding bracket, a holder mounted on said fixture for oscillation transversely of said cam, a follower on said holder for engaging the periphery of said cam, adjustable spring means mounted on said bracket and acting against said holder to hold said follower against said cam, a control cam corresponding in transverse form to said master cam and mounted on said spindle for rotation therewith, an extensible and contractible bellows mounted on said fixture and engaging said holder with a pressure tending to separate said follower from said master cam, an extensible and contractible bellows coacting with said control cam, and a fluid line connecting said bellows, said bellows and line constituting a closed hydraulic pressure transmitting system adapted to be filled with a fluid under a predetermined normal pressure.

6. In a metal turning machine, in combination, a spindle, a cam of non-circular cross-section mounted on said spindle for rotation therewith, a holder movable transversely of said cam, a follower on said holder for coacting with the periphery of said cam, means coacting with said holder for urging said follower with a predetermined pressure toward said cam, and hydraulic means coacting with said holder in opposition to said means, said hydraulic means being automatically adjustable to compensate for the accelerating and decelerating forces set up by rotation of said cam.

7. In a metal turning machine, in combination, a spindle, a cam of non-circular cross-section mounted on said spindle for rotation therewith and having a hard metallic peripheral face, a holder pivotal transversely of said cam, a non-metallic follower on said holder for coacting with the periphery of said cam, means coacting with said holder for urging said follower with a predetermined pressure toward said cam, and means coacting with said holder in opposition to said first mentioned means being automatically adjustable to compensate for the accelerating and decelerating forces set up by rotation of said cam.

8. In a metal turning machine, in combination, a spindle, a cam of non-circular form rotatable therewith, a holder movable transversely of said cam, a follower on said holder for coacting with the periphery of said cam, means coacting with said holder for urging said follower with a predetermined pressure toward said cam, a sealed hydraulic system enclosing a trapped body of fluid within an adjustable space including a pressure element coacting with said holder to oppose said means and a second space controlling element, and a pressure control cam mounted on said spindle and coacting with said last mentioned element to adjust said space and hence the pressure of said fluid acting on said first mentioned element to maintain the contact pressure between said cam and follower constant in all positions of rotation of said cam.

9. In a metal turning machine, in combination, a spindle, a cam of non-circular cross-section mounted on said spindle for rotation therewith, a holder movable transversely of said cam, a follower on said holder for coacting with the periphery of said cam, pressure imparting means for urging said holder yieldably toward said cam, and means controlling said last mentioned means for maintaining the contact pressure between said cam and follower substantially constant.

10. In a metal turning machine, in combination, a drive spindle for rotating a coaxial work piece, a cam having a hardened steel peripheral face and mounted for synchronous rotation coaxially with said work piece, a tool fixture mounted for movement axially of said spindle, an anti-friction bearing support on said fixture and adjustable axially to prevent radial and end play, a holder mounted on said support for oscillation transversely of said cam, a non-metallic follower on said holder for engagement with said cam, and a cutting tool movable synchronously with said follower for engagement with the work piece.

11. In a metal turning machine, in combination, a drive spindle for rotating a coaxial work piece, a cam having a peripheral face and mounted for synchronous rotation coaxially with said work piece, a tool fixture mounted for movement axially of said spindle, an anti-friction bearing support on said fixture and adjustable axially to prevent radial and end play, a holder mounted on said support for oscillation transversely of said cam, a follower on said holder for engagement with said cam, and a cutting tool movable synchronously with said follower for engagement with the work piece.

12. In a metal turning machine, in combination, a drive spindle for rotating a coaxial work piece, a cam having a peripheral face and mounted for synchronous rotation coaxially with said work piece, a tool fixture mounted for movement axially of said spindle, and having two spaced upstanding lugs, a shaft seated in a fixed position in one of said lugs and having a peripheral shoulder, a peripheral and end thrust anti-friction bearing on said shaft against said shoulder, a second shaft mounted for axial adjustment in the other of said lugs, and aligned with said first mentioned shaft and having a peripheral shoulder facing said first mentioned shoulder, a peripheral and end thrust anti-friction bearing on said second shaft against said last mentioned shoulder, a holder supported by said bearings for oscillation transversely of said spindle, a cam follower on said holder coacting with said cam, and a cutting tool on said holder for engaging the work piece.

13. In a metal turning machine, in combination, a drive spindle for rotating a coaxial work piece, a cam having a hardened peripheral metal face and mounted for synchronous rotation coaxially with said work piece, a tool fixture mounted for relative movement axially of said spindle, and having two spaced upstanding lugs, a shaft seated in a fixed position in one of said lugs, an anti-friction bearing on said shaft, a second shaft mounted for axial adjustment in the other of said lugs and aligned with said first mentioned shaft, an anti-friction bearing on said second shaft, a holder supported by said bearings for oscillation transversely of said spindle, a non-metallic cam follower on said holder coacting with said cam, and a cutting tool movable by said holder for engaging the work piece.

14. In a turning machine, in combination with a spindle for rotating a piece of work, a table, means for effecting relative movement between said spindle and table longitudinally of said spindle, a master cam mounted for rotation in timed relation to said spindle, means for securing said cam in predetermined angular phase relation to said work piece, a first tool holder mounted on said table for oscillation transversely of said spindle, a second tool holder mounted on said table, a cam follower on said first holder for coacting with said cam, yieldable means for urging said follower into engagement with said cam, a cutting tool on said first holder for engaging said work piece, two spaced cutting tools on said second holder for engaging said work piece, and means for moving said holders into and out of operative position.

15. In a turning machine, in combination with a spindle for rotating a piece of work, a table, means for effecting relative movement between said spindle and table longitudinally of said spindle, a master cam mounted for rotation in timed relation to said spindle, a first tool holder mounted on said table for oscillation transversely of said spindle, a second tool holder mounted on said table, a cam follower on said first holder for coacting with said cam, hydraulic means for urging said follower into engagement with said cam, a cutting tool on said first holder for engaging said work piece, and two spaced cutting tools on said second holder for engaging said work piece.

16. In a turning machine, in combination with a spindle for rotating a piece of work, a table, means for effecting relative movement between said spindle and table longitudinally of said spindle, a master cam mounted for rotation in timed relation to said spindle, means for securing said cam in predetermined angular phase relation to said work piece, a first tool holder mounted on said table for oscillation transversely of said spindle, a second tool holder mounted on said table for movement transversely of said spindle, a cam follower on said first holder for coacting with said cam, yieldable means for urging said follower into engagement with said cam, a cutting tool on said first holder for engaging said work piece, a cutting tool on said second holder for engaging said work piece, means for moving said second holder into and out of operative position, and means on said second holder for engaging said first holder to move said first holder into inoperative position against the action of said yieldable means.

17. In a turning machine, in combination with a spindle for rotating a piece of work, a table, means for effecting relative movement between said spindle and table longitudinally of said spindle, a master cam mounted for rotation in timed relation to said spindle, a tool holder mounted on said table on adjustable anti-friction bearings for oscillation transversely of the axis of the work piece, a non-metallic cam follower on said holder for engaging said cam, yieldable means for urging said follower with a predetermined pressure against said cam, and a tool on said holder for engaging the work piece.

18. In a metal cutting machine, in combination, a base, a fixed headstock on said base and having a drive spindle for a work piece, a table slidable on said base longitudinally of said spindle, a master cam mounted on said spindle for rotation with the work piece, means for securing said cam and work piece in predetermined angular phase relation to each other and to said spindle, a tool fixture mounted on said table and having an oscillatory tool holder movable transversely of said spindle, a follower fixed on said holder and coacting with said cam, a cutting tool on said holder for engaging the work piece, and means for urging said follower yieldably against said cam.

19. In a metal turning machine, in combination, a drive spindle for a work piece having a sleeve and a transverse hole and a transverse internal rib, means on said spindle defining an annular clamping face, a tubular cam slidably disposed on said spindle and against said face and having an annular centering notch in its outer end adapted to receive said sleeve, a draw bar extending slidably through said spindle, a head on said bar having a transverse bar for engaging in said hole to secure said cam and work piece in coaxial assembled relation, a spring-actuated locating member on the end of said block and engaging said rib to locate the work piece angularly relatively to said draw bar, releasable means for locating said cam angularly relatively to the work piece, a movable follower coacting with said cam, and a cutting tool movable synchronously with said follower for engagement with the work piece.

20. In a metal turning machine, in combination, a drive spindle, an adapter plate secured to said spindle for rotation therewith and having an annular end face and an axial projection, a tubular cam removably mounted on said projection and having a serrated end engaging said face, a spring-actuated wedge pin slidably disposed in said plate for selective engagement with the serrations on said last mentioned face to locate said cam in predetermined angular phase with said spindle, means for locking said pin in position, a movable cam follower coacting with said cam, and a cutting tool movable synchronously with said follower.

21. In a metal turning machine, in combination, a high speed drive spindle, generally cylindrical cam of hardened steel, mounted on said spindle and being tapered longitudinally and elliptical in cross section, a non-metallic follower movable transversely of and adapted to coact with the peripheral surface of said cam, means for urging said follower yieldably into pressure engagement with said cam, and a cutting tool movable synchronously with said follower.

22. In a metal turning machine, in combination, a generally cylindrical high speed rotary cam of hardened metal of non-circular peripheral form, a non-metallic follower oscillatory transversely of and adapted to coact with the peripheral surface of said cam, means for feeding said follower relatively along said cam, means for urging said follower yieldably into pressure engagement with the peripheral face of said cam, and a cutting tool movable synchronously with said follower.

23. In a metal turning machine, in combination, a generally cylindrical cam tapered longitudinally and elliptical in cross-section, a follower mounted to swing transversely of and adapted to coact with the peripheral surface of said cam, means for urging said follower yieldably into engagement with said cam, means for automatically varying the pressure of said means on said follower in accordance with the rotation of said cam, and a cutting tool movable synchronously with said follower.

24. In a machine tool having a headstock, a spindle projecting therefrom and carrying rotatably therewith in axial alinement a templet in the form of an oval cam and a piston to be turned, an attachment for oval turning the piston comprising a supporting plate, a member journaled in said plate with its axis substantially parallel with the axis of the spindle, a cam follower fixedly supported on said member for engagement with the cam, and a tool holder fixedly supported on said member for engagement of a tool therein with the piston whereby the cam follower and the tool holder are mounted for oscillatory movement substantially radially of said cam and piston.

25. In a metal cutting machine, in combination, a base, a fixed headstock on said base and having a drive spindle for a work piece, a table slidable on said base longitudinally of said spindle, a master cam mounted on said spindle for rotation with the work piece, means for securing said cam and work piece in predetermined angular phase relation to each other and to said spindle, a tool fixture mounted on said table and having an oscillatory tool holder movable transversely of said spindle, means for pivotally supporting said tool holder on said fixture and including oppositely acting end thrust anti-friction bearings, means for relatively adjusting said bearings axially to prevent end play, a follower fixed on said holder and coacting with said cam, a cutting tool on said holder for engaging the work piece, and means for urging said follower yieldably against said cam.

26. In a machine tool having a base and a headstock on said base, a spindle projecting from said headstock, a template in the form of a generally cylindrical cam removably mounted on said spindle for rotation therewith in axial alignment and being tapered longitudinally and elliptical in cross section, said spindle being adapted to support a piston for rotation therewith in axial alignment, a member mounted on said base for movement longitudinally of said spindle, a cam follower and a cutting tool supported in fixed relation to each other on said member for joint movement transversely of said spindle and in engagement respectively with the peripheries of said cam and the piston, said follower and said tool being adjustable relatively to each other transversely of said spindle, and resilient means for urging said follower and said tool substantially radially toward said cam on said piston.

27. In a machine tool having a base and a headstock on said base, a spindle projecting from said headstock, a template in the form of a generally cylindrical cam removably mounted on said spindle for rotation therewith in axial alignment and being elliptical in cross section, said spindle being adapted to support a piston for rotation therewith in axial alignment, a member mounted on said base for movement longitudinally of said spindle, a cam follower and a cutting tool supported in fixed relation to each other on said member for joint movement transversely of said spindle and in engagement respectively with the peripheries of said cam and the piston, and resilient means for urging said follower and said tool substantially radially toward said cam on said piston.

IRA J. SNADER.

CERTIFICATE OF CORRECTION.

Patent No. 2,146,774.    February 14, 1939.

IRA J. SNADER.

It is hereby certified that error appears in the printed specification of the above numbered patent requiring correction as follows: Page 1, first column, line 38, for "eccentricites" read eccentricities; page 6, second column, line 64, claim 21, before "generally" insert a; line 68, same claim, after "movable" insert longitudinally and; and that the said Letters Patent should be read with this correction therein that the same may conform to the record of the case in the Patent Office.

Signed and sealed this 11th day of April, A. D. 1939.

Henry Van Arsdale

Acting Commissioner of Patents.

(Seal)

form, a non-metallic follower oscillatory transversely of and adapted to coact with the peripheral surface of said cam, means for feeding said follower relatively along said cam, means for urging said follower yieldably into pressure engagement with the peripheral face of said cam, and a cutting tool movable synchronously with said follower.

23. In a metal turning machine, in combination, a generally cylindrical cam tapered longitudinally and elliptical in cross-section, a follower mounted to swing transversely of and adapted to coact with the peripheral surface of said cam, means for urging said follower yieldably into engagement with said cam, means for automatically varying the pressure of said means on said follower in accordance with the rotation of said cam, and a cutting tool movable synchronously with said follower.

24. In a machine tool having a headstock, a spindle projecting therefrom and carrying rotatably therewith in axial alinement a templet in the form of an oval cam and a piston to be turned, an attachment for oval turning the piston comprising a supporting plate, a member journaled in said plate with its axis substantially parallel with the axis of the spindle, a cam follower fixedly supported on said member for engagement with the cam, and a tool holder fixedly supported on said member for engagement of a tool therein with the piston whereby the cam follower and the tool holder are mounted for oscillatory movement substantially radially of said cam and piston.

25. In a metal cutting machine, in combination, a base, a fixed headstock on said base and having a drive spindle for a work piece, a table slidable on said base longitudinally of said spindle, a master cam mounted on said spindle for rotation with the work piece, means for securing said cam and work piece in predetermined angular phase relation to each other and to said spindle, a tool fixture mounted on said table and having an oscillatory tool holder movable transversely of said spindle, means for pivotally supporting said tool holder on said fixture and including oppositely acting end thrust anti-friction bearings, means for relatively adjusting said bearings axially to prevent end play, a follower fixed on said holder and coacting with said cam, a cutting tool on said holder for engaging the work piece, and means for urging said follower yieldably against said cam.

26. In a machine tool having a base and a headstock on said base, a spindle projecting from said headstock, a template in the form of a generally cylindrical cam removably mounted on said spindle for rotation therewith in axial alignment and being tapered longitudinally and elliptical in cross section, said spindle being adapted to support a piston for rotation therewith in axial alignment, a member mounted on said base for movement longitudinally of said spindle, a cam follower and a cutting tool supported in fixed relation to each other on said member for joint movement transversely of said spindle and in engagement respectively with the peripheries of said cam and the piston, said follower and said tool being adjustable relatively to each other transversely of said spindle, and resilient means for urging said follower and said tool substantially radially toward said cam on said piston.

27. In a machine tool having a base and a headstock on said base, a spindle projecting from said headstock, a template in the form of a generally cylindrical cam removably mounted on said spindle for rotation therewith in axial alignment and being elliptical in cross section, said spindle being adapted to support a piston for rotation therewith in axial alignment, a member mounted on said base for movement longitudinally of said spindle, a cam follower and a cutting tool supported in fixed relation to each other on said member for joint movement transversely of said spindle and in engagement respectively with the peripheries of said cam and the piston, and resilient means for urging said follower and said tool substantially radially toward said cam on said piston.

IRA J. SNADER.

---

CERTIFICATE OF CORRECTION.

Patent No. 2,146,774.            February 14, 1939.

IRA J. SNADER.

It is hereby certified that error appears in the printed specification of the above numbered patent requiring correction as follows: Page 1, first column, line 38, for "eccentricites" read eccentricities; page 6, second column, line 64, claim 21, before "generally" insert a; line 68, same claim, after "movable" insert longitudinally and; and that the said Letters Patent should be read with this correction therein that the same may conform to the record of the case in the Patent Office.

Signed and sealed this 11th day of April, A. D. 1939.

Henry Van Arsdale (Seal)                                Acting Commissioner of Patents.